United States Patent [19]
Malberg

[11] 4,002,401
[45] Jan. 11, 1977

[54] MULTIPLE PATTERN DISPLAY DEVICE

[76] Inventor: Kenneth E. Malberg, 2673 Greenbrier, Anaheim, Calif. 92801

[22] Filed: Sept. 18, 1975

[21] Appl. No.: 614,744

[52] U.S. Cl. ................................. 350/4; 35/28; 40/31; 40/53 R; 40/86 R; 40/132 E; 352/97; 353/35

[51] Int. Cl.² .................... G02B 27/08; B44D 2/00

[58] Field of Search ............ 350/4; 35/40, 27, 28; 40/31, 32, 53 R, 53 A, 78, 78.05, 78.07, 86 R, 86 A, 132 E; 355/79; 353/108, 109, 35; 352/87, 97, 123, 104

[56] References Cited

UNITED STATES PATENTS

| | | | |
|---|---|---|---|
| 2,225,903 | 12/1940 | Chaix | 35/27 X |
| 2,813,457 | 11/1957 | Fitzgerald | 35/28 UX |
| 2,837,962 | 6/1958 | Kneitel | 35/28 UX |
| 2,900,867 | 8/1959 | Beatman | 350/4 |
| 3,151,409 | 10/1964 | Bogaart | 350/4 X |
| 3,160,975 | 12/1964 | Malina | 350/4 X |
| 3,299,539 | 1/1967 | Leiber | 40/31 X |
| 3,363,334 | 1/1968 | Watkin | 35/28 |

*Primary Examiner*—Richard A. Wintercorn
*Attorney, Agent, or Firm*—William C. Babcock

[57] ABSTRACT

A multiple pattern display device comprising a plurality of strips interlaced in a weave to expose selected sections thereof. The strips are attached to rollers at the ends thereof, and as the rollers are driven in rotation the exposed sections of the strips within the weave are varied. In this manner various messages can be sequentially displayed. The weaved arrangement of the strips is maintained in a coherent relationship by gearing the rollers such that as the rollers are turned various messages are formed by the exposed group of strip segments. During the transition between messages a kaleidoscopic effect is produced which typically is interesting to viewers.

11 Claims, 8 Drawing Figures

U.S. Patent Jan. 11, 1977 4,002,401
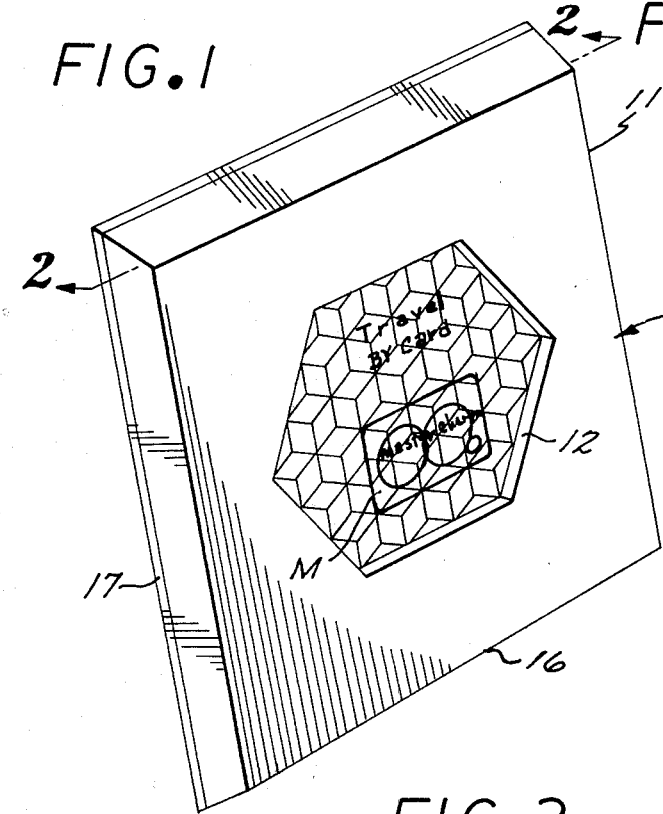
FIG. 1
FIG. 8
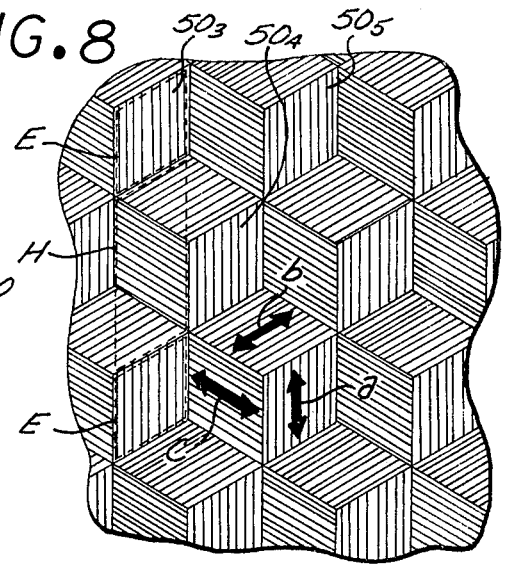
FIG. 2
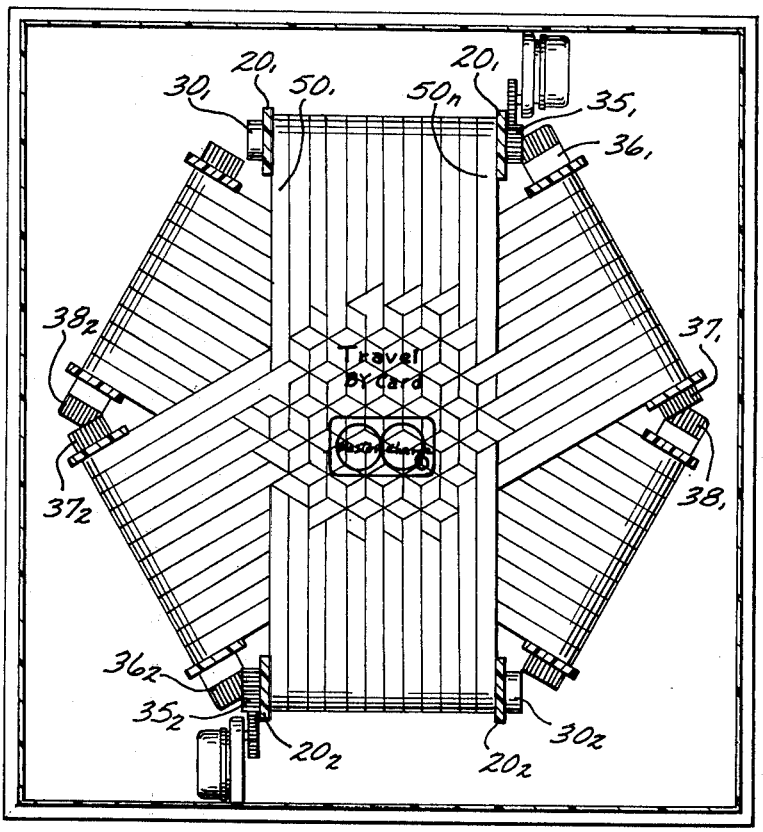
FIG. 7
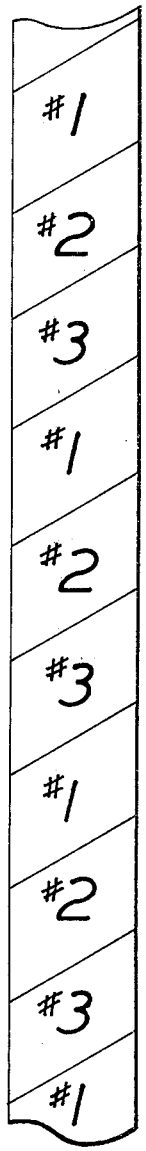

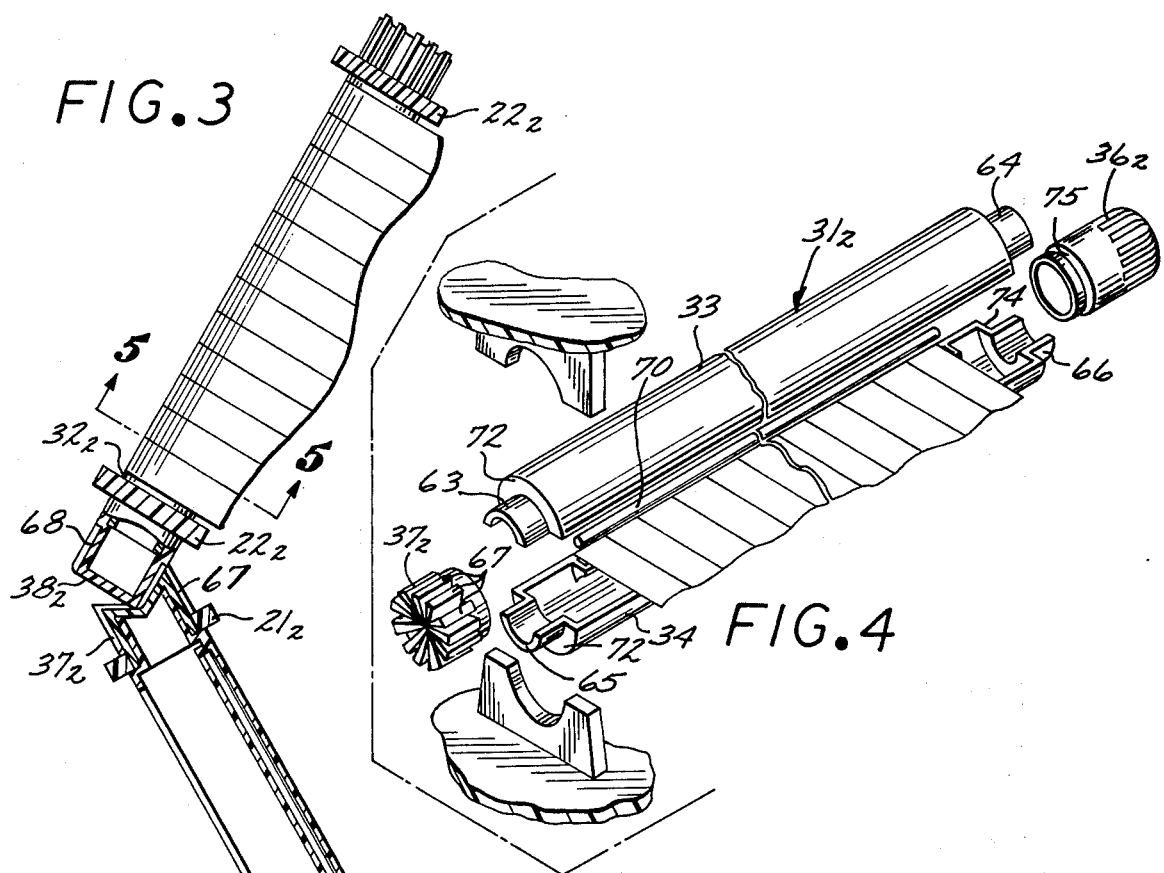
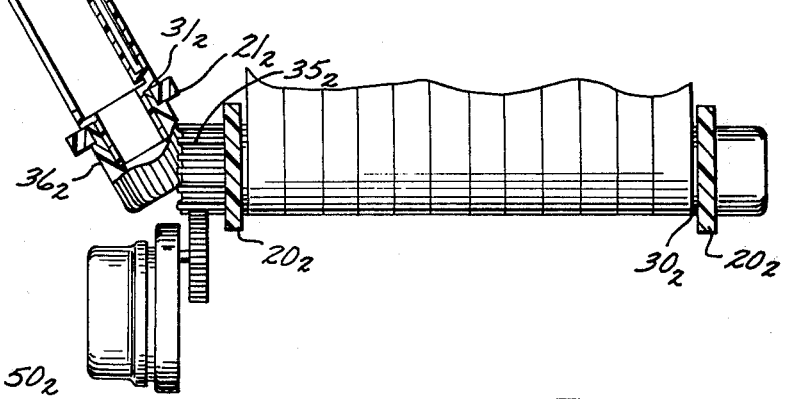
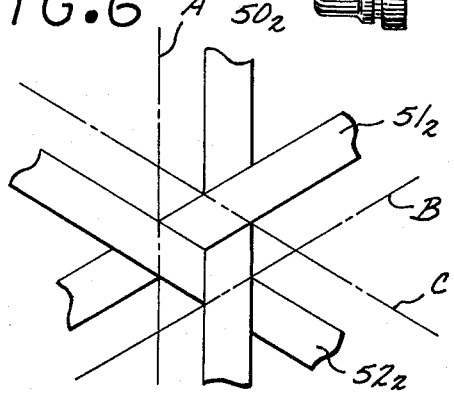
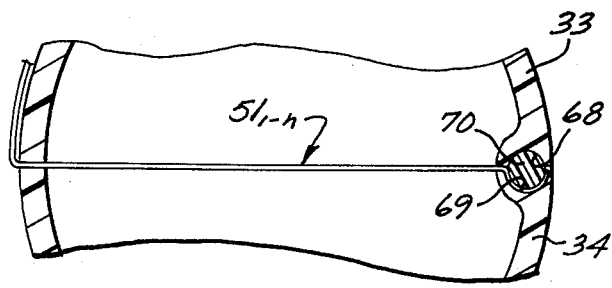

MULTIPLE PATTERN DISPLAY DEVICE

BACKGROUND OF THE INVENTION

1. Field of the Invention

The present invention relates to display devices, more particularly to kaleidoscopic displays whereby a plurality of messages are sequentially displayed in a single display aperture.

2. Description of the Prior Art

Articulated advertising displays on which various messages are cyclically shown have been known in the past. Most such prior art displays, however, utilize three dimensional articulated elements which are normally moved in coherent rotation so that at any one instant of time one common surface is displayed. On this common surface an advertising slogan or message is inscribed and as the segments are rotated the other sides thereof are exposed to view, other messages are thus displayed. This manner of producing a cyclic display entails, however, many movable parts which have to operate in a coherent relationship with each other. Integration of such a plurality of parts normally entails large production costs with a result that such displays are typically too expensive for commercial acceptance.

Other multiple message displays often rely on light refraction through a plurality of prisms where the message displayed depends on the viewing angle of the display surface. These displays, while not very expensive, lack the desired optical fidelity found necessary in advertising. Thus in each application a decision has to be made between cost and fidelity.

An additional consideration necessarily contemplated in deciding which of the display forms are to be chosen is the complexity of the first prior art devices. Structures of this complexity always present the chance for malfunction. Very often this chance for malfunction, with the resulting derogation of the message, is the decisive factor in determining whether a display is used or not.

Furthermore, the transition patterns between messages of the prior art devices are typically plain, being dictated by the shape of the apparatus. During this transition the attention of the viewer is easily diverted with the attendant loss of effectiveness of the device.

SUMMARY OF THE INVENTION

Accordingly it is the general purpose and object of the present invention to provide a display device comprising a plurality of interlaced strips which are advanced in synchronism to expose various messages, and to provide a kaleidoscopic transition pattern between the messages.

Other objects of the invention are to provide a display device which is limited in fidelity only by the fidelity of print on a strip of paper.

Yet further objects of the invention are to provide a display device which is easy to produce, simple to maintain and requires few parts.

These and other objects are accomplished according to the present invention by interlacing a plurality of paper strips of film disposed in common adjacent bands stretched between opposed rollers, each band of strips being aligned at 60° intervals with the other bands. The interlacing comprises a weaved arrangement of the strips within each band on which a display message is inscribed. The rollers at the end of each band are geared for common rotation whereby the advancement of one band of strips is coherent with the advancement of the other bands of strips. The resulting effect is that the common advancement of the strips then permit the display of a second and a third message within the same aperture.

In order to facilitate attachment of the strips between these two opposed rollers, each roller is formed as a split roller receiving therebetween the ends of the strips forming a band. Specifically, the strips are secured between the rollers by a transverse dowel which is receivable in a groove formed in one of the roller halves. The bands are maintained taut between the opposed rollers gearing one set of rollers to one electric stepping motor and the other set of rollers is similarly geared to yet another electric stepping motor which is phased to oppose the first stepping motor. The gearing of the roller sets is accomplished by way of conical receipt of end splines on each roller in the corresponding spline of the other roller.

These splines at the end of the rollers also act to hold the roller halves together, the roller halves in turn being retained in end or gearing plates which align the band.

BRIEF DESCRIPTION OF THE DRAWINGS

FIG. 1 is a perspective illustration of a display device constructed according to the present invention;

FIG. 2 is a plan view in partial cross section taken along the line 2—2 of FIG. 1;

FIG. 3 is a sectional view illustrating the detail of the roller engagement as shown according to the present invention;

FIG. 4 is an exploded view, in perspective, of one roller assembly constructed according to the present invention;

FIG. 5 is a sectional view taken across one split roller, illustrating the inventive manner of retaining the strips therein;

FIG. 6 is a diagrammatic illustration of the interlacing weave according to the present invention;

FIG. 7 is a section of a plan view illustrating the sequential display of the individual strips within one band; and FIG. 8 is an illustration indicating the various direction of motion of strips as practiced according to the present invention.

DESCRIPTION OF THE SPECIFIC EMBODIMENT

While the following description specifically describes an embodiment utilizing a three-directional weave of strips for displaying a message, such is exemplary only. It is believed that various other weave combinations will be obvious to those skilled in the art from the teachings herein and no intent to limit the scope of the invention is expressed by the following selection of parts.

As shown in FIG. 1, a display generally designated by the numeral 10, comprises a rectangular housing 11, comprising an upper or face portion 16 and a base section 17. Formed in the face section 16 is a hexagonal display opening 12. Exposed to view within opening 12 are a plurality of interlaced strips having inscribed on the exposed sections thereof a message designated as message M. As will be described in more detail below, the orientation of the interlaced strips is essentially normal to the correspondingly opposed edges of the hexagonal opening 12. Thus, the strips pass across opening 12 in three directions which, according to this embodiment, are at 120° intervals of arc.

As shown in more detail in FIG. 2, disposed on the interior of housing 11 between sections 16 and 17 and along the edges of opening 12, are a plurality of bearing plates arranged in opposing pairs $20_1$ and $20_2$, $21_1$ and $21_2$, and $22_1$ and $22_2$. These bearing plate pairs each retain the ends of a corresponding roller, again disposed in opposing pairs across opening 12, the rollers being designated herein as rollers $30_1$ and $30_2$, $31_1$ and $31_2$, and $32_1$ and $32_2$, where the common number designates a particular roller pair with the individual rollers in a pair being designated by the subscript. As an example, rollers $30_1$ and $30_2$ are disposed opposite each other on the interior of housing 11 respectively distal of the upper and lower horizontal edges thereof. Similarly rollers $31_1$ and $31_2$, retained by bearing plate pairs $21_1$ and $21_2$, are disposed across opening 12 at approximately 120° incidence with respect to the axes of rollers $30_1$ and $30_2$. And rollers $32_1$ and and $32_2$ are aligned across opening 12, again at 120° incidence relative the axis of the adjacent rollers.

Stretched partly around roller $30_1$ and extending to partly surround roller $30_2$ is a band of adjacent film strips designated herein as film strips $50_{1-n}$. Similarly stretched between rollers $31_1$ and $31_2$ is a band of adjacent film strips designated as film strips $51_{1-n}$. Yet another band of film strips is stretched across rollers $32_1$ and $32_2$ comprising strips $52_{1-n}$. Strips $50_{1-n}$, $51_{1-n}$, and $52_{1-n}$ are all of equal width and are interlaced in a ternary weave to expose selected sections thereof to view. By common rotation of the rollers 30, 31 and 32 on which these strips are retained the particular strip sections exposed can be changed. To accomplish this common rotation, rollers $30_1$, $31_1$ and $32_1$ are geared in common. More specifically roller $30_1$ includes, at one end thereof, distal of the bearing plate $20_1$, a splined retainer $35_1$. This splined retainer includes a splined conical depression in the free end surface into which a conical splined retainer $36_1$, mounted on the adjacent end of roller $31_1$, is received. Similarly the other end of roller $31_1$ is geared by way of a conically deformed splined retainer 37, at the other end engaging a retainer $38_1$ mounted on the adjacent end of roller $32_1$.

To advance these rollers the exterior splines of retainer $35_1$ are in mesh with an output gear 41 from an electric stepping motor 42. An increment of rotation to advance strip sections equal to an exposed section is set conventionally by the ratio of gear 41 relative the splined retainer $35_1$ and the stepping increment of the motor 42. Thus strips $50_1 - 50_n$ are advanced in steps by increments equal to the interlacing dimensions across the other strips.

Rollers $30_2$, $31_2$ and $32_2$ are similarly geared being driven by yet another stepping motor 47 across an output gear 46. The phase angle or the pole angle of the stepping motor 42 and the stepping motor 47 is furthermore set to maintain the respective strips disposed across the rollers in stretch.

By specific reference to FIGS. 3, 4 and 5, the detailed implementation of the above-mentioned gearing and the retention of the film strips within the split rollers is set forth. More specifically, shown in FIG. 3 are rollers $30_2$, $31_2$ and $32_2$, it being understood that rollers $30_1$, $31_1$ and $32_1$ are similarly arranged. By particular reference to FIG. 4 roller $31_2$ is illustrated comprising two semicircular tubular shells 33 and 34 which when mated form the roller. Each shell at the distal ends thereof is reduced in section to form semicircular projections 63 and 64 extending from the ends of shell 33 and projections 65 and 66 from shell 34. Projections 63 and 65, when mated, form a reduced diameter roller end which is receivable within the interior of retainer $37_2$. Retainer $37_2$ is formed in the manner of an end cap, hollow on the inside, with the interior thereof conformed to the exterior dimensions of projections 63 and 62. Formed on the peripheral exterior surface of retainer $37_2$ are a plurality of longitudinal splines 67 which are extended along an inward taper over the end section of the retainer to engage splines 68 formed on the exterior retainer $38_2$ surrounding the proximate end projection of roller $32_2$. Rollers $30_1$, $30_2$, $31_1$, $31_2$, $32_1$ and $32_2$ are all of a similar structure and the description of roller $31_2$ is therefore common to the other rollers.

To secure the ends of strips $51_{1-n}$ between the shells 33 and 34 forming roller $31_2$ there is formed along one longitudinal edge of shells 33 a longitudinal groove 68 which opposes a groove 69 in shell 34 when the shells are mated. Insertable longitudinally in grooves 68 and 69 is a dowel 70 which is utilized to clamp the ends of strips $51_{1-n}$ within either one of the grooves. Strips $51_{1-n}$ are then drawn across the mating faces between shells 33 and 34 to stretch around shell 33 towards the opposite roller where they are similarly secured.

As previously stated shells 33 and 34 are fixed in an opposing alignment by the corresponding retainer at the ends thereof. Each roller so formed is then secured within the corresponding bearing plate pairs $20_1$, $20_2$, $21_1$, $21_2$, $22_1$ and $22_2$. More specifically the splines 67 on the peripheral surface of the splined retainer $37_2$ are cut off over a circular section along the open edge of the retainer to form a bearing surface receivable within the corresponding bearing plate. The bearing plate is then opposed on the other side by a shoulder 72 formed in the shells 33 and 34 at the juncture with the corresponding projections 63 and 65. Similarly a shoulder 74 on the shells 33 and 34 opposes a shoulder 75 formed around the other retainer $36_2$, securing therebetween the other bearing plate $21_1$.

As is further illustrated in FIG. 4 each bearing plate is formed in two opposed halves, in a common clam shell arrangement. While such manner of construction is suited for the purposes herein, other manners of forming the bearing plates can be utilized. For the purposes herein it is intended that the rectangular enclosure 11 be split into upper and lower sections 16 and 17 respectively, each being connected to the respective bearing halves.

With the foregoing description of the roller assembly utilized herein the operation of the invention will now be set forth. As shown in FIG. 6 an interaction of three strips, illustrated herein as strips $50_2$, $51_2$ and $52_2$ is arranged with strip $50_2$ being aligned in the direction of axis A below strip $51_2$ aligned along axis B. Strip $52_2$, oriented along an axis C, is weaved over a section of strip $51_2$ and under a section of strip $50_2$. By staggering in a ternary stagger the relationships of the strips, as illustrated in FIG. 7, a weave can be achieved on which a particular message M is displaced. Subsequent advancement of the strips to expose other sections thereof will then expose other messages. The direction of advancement of the strips is best shown in FIG. 8 by reference to the arrows a, b and c. As shown in this Figure the vertical strips $50_3$, $50_4$ and $50_5$ have exposed sections interweaved with hidden sections where the hidden section H of strip $50_3$ for example comprises a surface area equal to two contiguous exposed sections E. This is made possible by virtue of the interweaving order and by maintaining all strips at equal width.

Thus advancement of strip $50_3$ will successively expose three individual parts of messages, two of which are hidden from view at any one time.

Some of the many advantages of the present invention should now be readily apparent. The invention provides, by means which are simple to produce and assembly, apparatus where a plurality of messages can be displayed in a planar display, each message being inscribed with full print fidelity. The invention provides further effects interesting to the viewer which occur during the changes in messages.

Obviously many modifications and variations to the above disclosure can be made without departing from the spirit of the invention. It is therefore intended that the scope of the invention be determined solely dependent on the claims hereto.

I claim:

1. A display device for cyclically exposing a plurality of messages to view, comprising:
    a housing;
    an aperture formed in the surface of said housing;
    a plurality of parallel first strips disposed in said housing and aligned along a first axis of translation below said aperture;
    a plurality of parallel second strips disposed in said housing and aligned along a second axis of translation below said aperture, alternative ones of said second strips being interlaced with alternative ones of said first strips; and
    means for advancing said first and second strips in coherent advancement.

2. Apparatus according to claim 1 wherein:
    said means for advancing includes a first pair of rollers disposed for rotation within said housing, individual ones of said first pair of rollers being disposed along opposed first edges of said aperture, said first pair of rollers having secured thereto the ends of said first strips, a second pair of rollers having individual ones thereof disposed in said housing along opposed second edges of said aperture and having secured thereto said second strips, and gearing means connecting said first rollers to said second rollers.

3. Apparatus according to claim 2 wherein said gearing means includes motor means for rotating said first and second rollers.

4. Apparatus according to claim 3 wherein said motor means includes a stepping motor and said gearing means includes a gear train selected to provide increments of advancement in said first strips equal to the width of said second strips for each step of said stepping motor, said increments of advancement of said second strips being equal to the width of said first strips.

5. Apparatus according to claim 4 wherein said first and second strips are of equal width.

6. Apparatus for advancing a plurality of interlaced strips comprising:
    a housing;
    a first set of rollers mounted for rotation in parallel alignment in said housing along a first axis;
    a second set of rollers mounted for rotation in parallel alignment in said housing along a second axis;
    a third set of rollers mounted for rotation in parallel alignment in said housing along a third axis, said first, second and third axes being aligned in one plane substantially at equal increments of arc;
    securing means included in said first, second and third rollers for securing the ends of corresponding first, second and third ones of said strips;
    gearing means disposed between the adjacent ends of said first, second and third rollers; and
    motor means engaging said gearing means for advancing said rollers in rotation.

7. Apparatus according to claim 6 wherein:
    said strips are of equal width.

8. Apparatus according to claim 7 wherein:
    said rollers each comprise a first and second semicircular half section; and
    said securing means includes longitudinal grooves formed in the opposed surfaces of said half sections and a dowel receivable in said grooves for retaining said strips therein.

9. Apparatus according to claim 8 wherein:
    said gearing means includes end gears adapted to receive corresponding ends of said half sections, respective ones of said gears being in mesh with respective other ones.

10. Apparatus according to claim 9 wherein:
    said motor means includes a stepping motor connected to an output gear, said output gear in turn engaging a selected one of said end gears the gear ratio of said output and end gears being selected to provide an increment of strip advancement equal to the square root of three times the width of said strips.

11. Apparatus according to claim 10 wherein:
    said housing includes an aperture exposing said strips to view and said strips include sections of messages inscribed thereon.

* * * * *